United States Patent
Kellison et al.

(10) Patent No.: US 6,176,638 B1
(45) Date of Patent: Jan. 23, 2001

(54) CHEMICALLY BONDED ANCHOR SYSTEMS

(76) Inventors: Roger C. Kellison, 18 Towpath Ct., Princeton, NJ (US) 08540; Leo Jasien, Box 22, Solebury, PA (US) 18963-0622

( * ) Notice: Under 35 U.S.C. 154(b), the term of this patent shall be extended for 0 days.

(21) Appl. No.: 08/929,031

(22) Filed: Sep. 15, 1997

Related U.S. Application Data

(63) Continuation-in-part of application No. 08/388,526, filed on Feb. 14, 1995, now abandoned.

(51) Int. Cl.$^7$ .................................................. F16B 13/14
(52) U.S. Cl. ..................... 403/268; 403/267; 403/408.1; 405/259.5; 52/698
(58) Field of Search .................................. 403/268, 269, 403/265, 27, 267, 266, 408.1; 52/698, 295, 296, 704, 410; 411/10, 11, 105, 156; 405/259.6, 259.5, 302.1; 404/6, 9

(56) References Cited

U.S. PATENT DOCUMENTS

| | | | |
|---|---|---|---|
| 2,850,937 | * | 9/1958 | Ralston .................................. 411/11 |
| 3,476,009 | * | 11/1969 | Markey ................................. 411/11 |
| 3,641,772 | * | 2/1972 | Dietrich ............................ 52/704 X |
| 3,678,815 | * | 7/1972 | Younker ................................... 14/73 |
| 3,892,101 | * | 7/1975 | Gruber ............................... 405/259.6 |
| 3,899,892 | * | 8/1975 | Yokota et al. .................... 403/265 X |
| 3,971,177 | * | 7/1976 | Endo .................................. 52/698 X |
| 4,179,861 | * | 12/1979 | Brown ............................... 405/259.6 |
| 4,586,846 | * | 5/1986 | Kellison ................................... 404/6 |
| 4,642,964 | | 2/1987 | Kellison ................................. 52/699 |
| 4,659,258 | * | 4/1987 | Scott ................................. 405/259.6 |
| 4,954,009 | | 9/1990 | Kellison ................................... 404/6 |
| 5,156,485 | * | 10/1992 | Ivey et al. ........................ 256/13.1 X |
| 5,199,835 | * | 4/1993 | Turner ................................... 411/11 |
| 5,302,047 | * | 4/1994 | Ivey ......................................... 404/6 |
| 5,443,324 | * | 8/1995 | Sullivan ................................... 404/6 |
| 5,466,086 | * | 11/1995 | Goto .................................... 403/268 |
| 5,660,492 | * | 8/1997 | Bathon ................................ 403/267 |

FOREIGN PATENT DOCUMENTS

| | | | |
|---|---|---|---|
| 3411253 | * | 10/1984 | (DE) ..................................... 52/698 |
| 410855 | * | 5/1934 | (GB) ..................................... 52/704 |
| 266692 | * | 7/1970 | (SU) ................................... 403/269 |

OTHER PUBLICATIONS

Promotional Literature Page entitled "Installation," Kelken–Gold, Inc. published prior to Feb. 14, 1994.
"Lock N' Load," Promotional Literature, Kelken–Gold, Inc., published prior to Feb. 14, 1994.
pp. 18 and 28, "Anchor Bolting Systems," Promotional Literature, Williams Form Engineering Corp., 1986.

* cited by examiner

*Primary Examiner*—Harry C. Kim
(74) *Attorney, Agent, or Firm*—Baker Botts L.L.P.

(57) ABSTRACT

Anchor systems for joining structural members include a resiliently deformable member such as a dished washer to permit easy visual determination that the anchor system is correctly tightened in place. Post-tensioned anchor systems of the kind disclosed are particularly suitable for joining structural members, such as end-to-end columns. One of a number of mold parts, including a threaded tapered mold part, forms a threaded tapered hole in a poured concrete structural member for use with anchors, and passages permitting the introduction of a resinous securing agent may be formed in cooperation with the threaded tapered holes. Highway barriers can be formed with such holes and joined with the resin filling the holes and space between barrier ends.

12 Claims, 5 Drawing Sheets

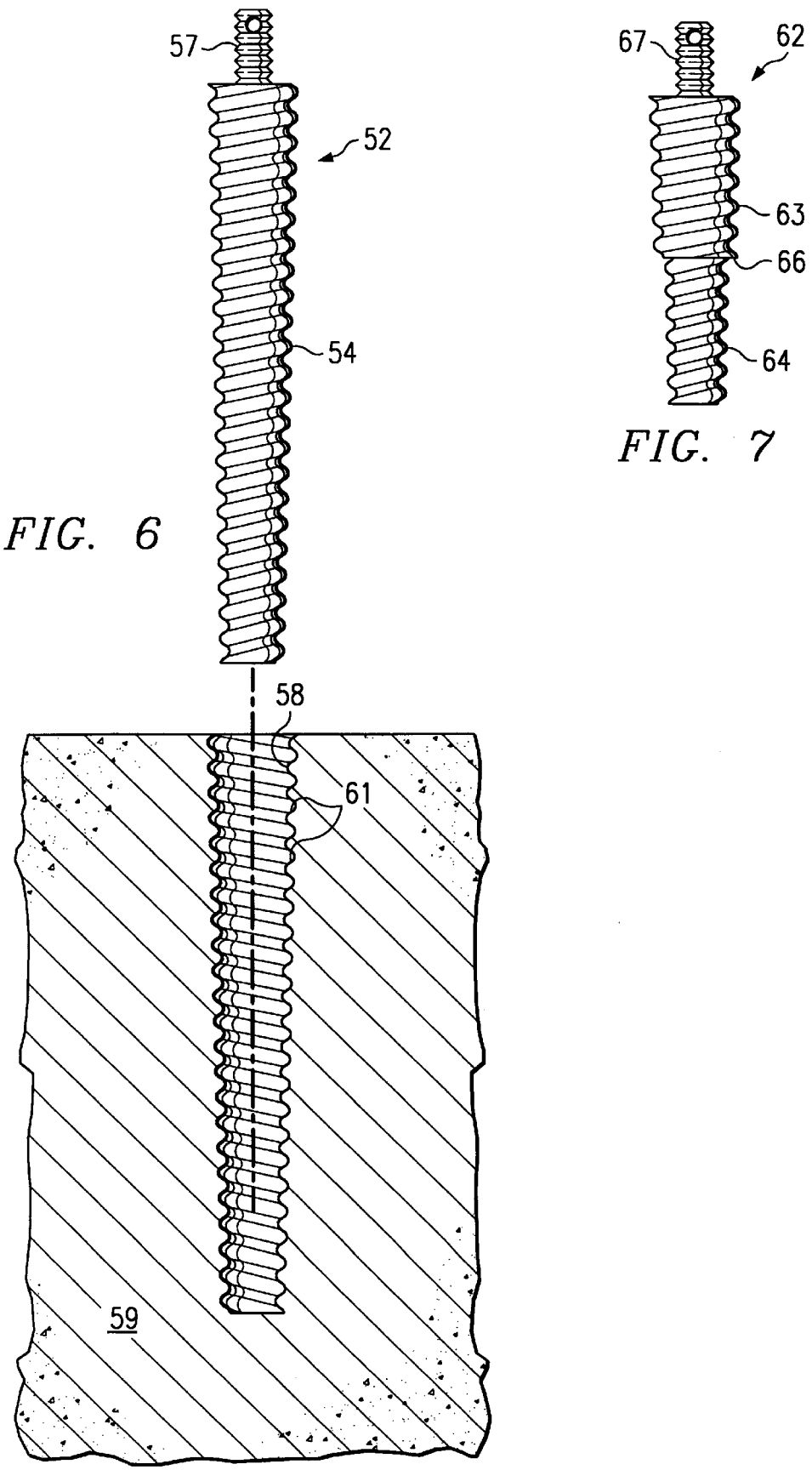

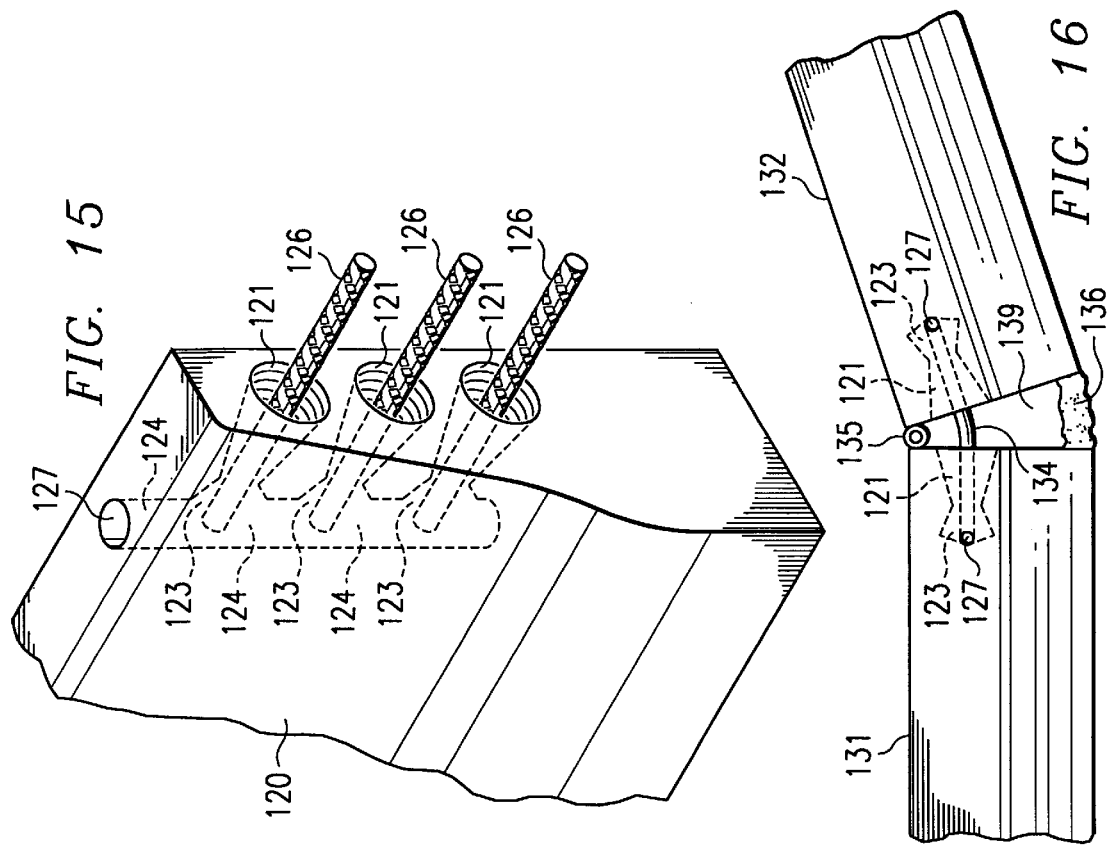
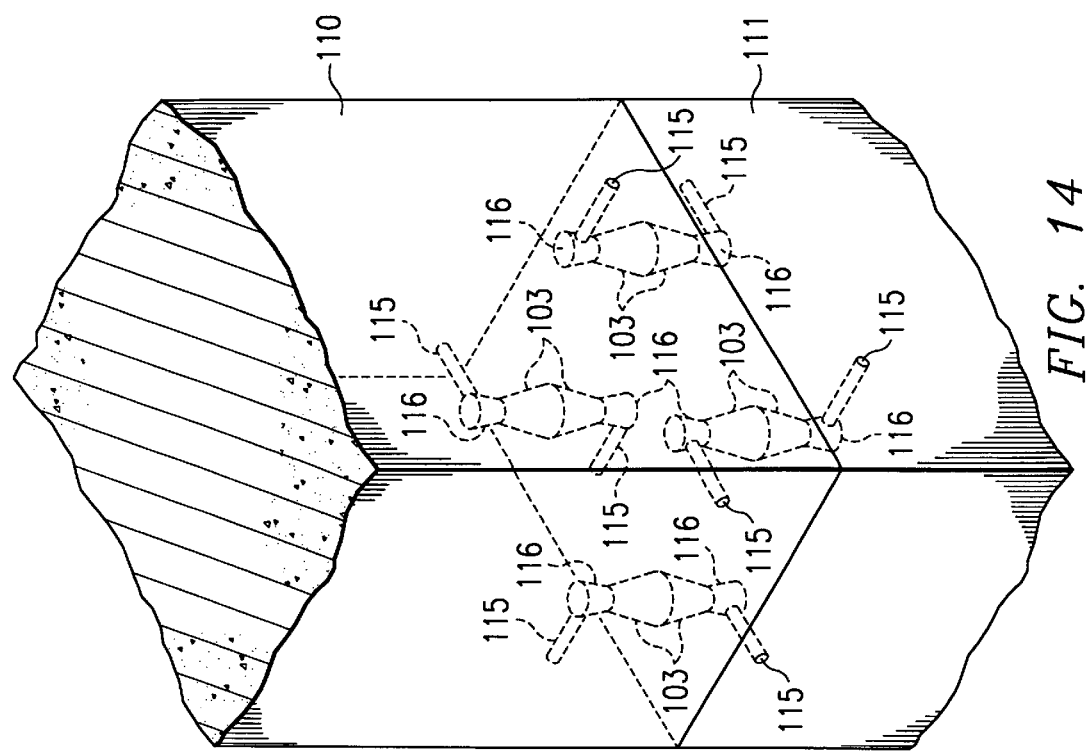

US 6,176,638 B1

CHEMICALLY BONDED ANCHOR SYSTEMS

This application is a continuation-in-part of application Ser. No. 08/388,526, filed on Feb. 14, 1995, now abandoned.

BACKGROUND OF THE INVENTION

This invention relates to anchor systems for joining structural members, methods of making and using those systems and combinations of structural parts joined by the anchor systems. More particularly, the invention relates to tensioned anchor systems that give an indication that the system is under the appropriate tension, mold parts used to adapt poured concrete structural members for use with the anchor systems and joined structural members, such as columns and road barriers, employing the anchoring systems of the invention.

Threaded anchors that are secured with a securing agent in a hole into which the anchor is inserted are well known. In an improved anchoring system a fast setting polymer resin is introduced into the hole to fill the bottom portion of the hole, and a significantly slower setting resin securing agent fills the remaining upper portion of the hole. Then, once the faster setting securing agent has set, the anchor is tensioned by turning down a retaining nut on the exterior end. The torque induced tension to which the anchor is drawn is calculated to be higher than any subsequent forces the anchor will subsequently receive when loaded. The tension is maintained in the anchor portion extending from the quick-setting securing agent to the nut as the slower setting securing agent hardens. The load transfer via the resins to the surrounding concrete structure is accomplished on a molecularly bonded radially distributed basis over the height of the now adhesively secured, strained steel anchor. The bonded, extended anchor thus has its torquing energy distributed to the concrete causing compression within the structure. The stored energy in these systems is available to react to subsequent loads. The molecular bonding provides much more efficient load transfer than a mere mechanical action from commonly used non-shrink cementitious grouts.

In the improved systems as just described it was not evident if subsequently the anchor had loosened, for example, by elongation due to creep. Nor was there a means for continuing to apply tension to an elongated anchor member.

Structural members such as columns supporting bridges or freeways have utilized adjoining openings between which extend an anchor member that may have been grouted in at least one of the openings, but that was itself passive or free of loading. During earthquakes, these joined structural members have been known to fail at such junctions. Typically the rebars joining the members are not pre-loaded, nor bonded to the concrete. Thus, they have very little capacity to resist enormous multi-directed lateral and vertical seismic forces.

A means for quickly readily forming a structural member to accept chemically secured-in-place anchors without leaving behind a residue of release agent in the freshly poured concrete has been needed to assure that a liquid securing agent introduced into a hole molded in the concrete had purchase on the interior surface of the hole and readily transfer loads on a molecular basis by virtue of the bond anchor and the concrete. Known hole firming devices have acted as bond breakers to the concrete. The result has been mechanical load transfer from the anchor to the concrete rather than load transfer at a molecular level.

Road barriers have been joined end-to-end in the past, but have not been readily adapted for the introduction of grout into anchor receiving openings, and they have not been joined end-to-end with an anchor especially adapted to permit their being situated at an angle other than 180°.

BRIEF SUMMARY OF THE INVENTION

In accordance with this invention there is provided improved anchoring systems and their methods of use, whereby a deformable indicating member is located between a retaining member or nut and the surface into which the anchor protrudes. Upon tightening, the deformed member is resiliently deformed. However its elastic memory urges its return towards its previous, undeformed condition so that, should the anchoring system tend to loosen by virtue of elongation of the anchor, the tendency of the deformable member to return to its initial condition indicates this fact and continues to place the anchor in tension.

The use of a post-tensioned anchor system to join columns end-to-end by introduction of the anchor system into a diagonally formed hole opening through the side of one of the columns places the columns in compression at their adjoining faces unlike the passive anchors previously used and found to be vulnerable in earthquakes. The system is especially suitable for retro-fitting columns joined in the manner previously described. Because load transfer in these chemically secured anchors operate at the molecular level an extremely secure adherence of the anchor to the structural member is afforded, one that typically exceeds the tensile strength of the anchor.

In securing road barriers to road surfaces superior force resistance has been observed by use of a tensioning method similar to that mentioned above for joining columns. A hole in the road surface is filled or partially filled with a fast setting resinous cement or securing agent, and an anchor is introduced into the hole through an aligned hole in the barrier. After the fast setting cement has set, a slower setting grout or securing agent is introduced to fill or partially fill the aligned holes in the road surface and the barrier. Before the slower setting grout or securing agent sets, the anchor is tensioned as described above to bring the road surface and barrier into compression by turning down a nut on the protruding threaded end of the anchor. Again, a stored energy system is created that is very resistive to impact or other external forces. The dished washer can again serve as a visual indicator of the tensioned condition of the anchor.

Poured concrete structural elements such as columns, footings for lamp standards, and concrete highway barriers, to name just a few, need to have holes formed to receive hardening securing agent if a chemically secured-in-place anchor is to be used. These holes can be molded efficiently through the use of an inventive, tapered mold part threaded along its length and formed of a plastic that readily releases from the hardened concrete around it. The tapered or conical shape permits quick removal by just a few turns until the threads of the mold part are free of the threads it has formed in the concrete structural member, at which time the mold part and can be lifted out. The use of a rod-like mold part in communication with the tapered mold part readily defines passages from the exterior of the structural concrete member to the interior of the tapered, threaded hole formed by the tapered, threaded mold part. By that means liquid securing agent can be introduced through the passages left by the rod-like mold part.

Additional means for forming a hole for anchors subsequently to be bonded to the inside walls of the formed hole include:

1. a longitudinally slit non-adherent sheath or sleeve that covers a metal rod. Upon withdrawal of the rod, the sheath snaps inward to its relaxed condition and is easily withdrawn.

2. A hard mold part covered with a plastic or other chemically removed covering of sufficient thickness such that when the mold part is withdrawn following chemical destruction of the covering, there results an annular space between the mold part and the molded concrete structural member of sufficient width to permit the introduction of securing adjacent. The hard mold part may be the anchor itself.

3. A mold part covering of polystyrene foam or other material that is sufficiently resistive to compressive forces to withstand the unhardened concrete in which it is immersed, but that will crumble upon withdrawal of the mold part.

4. A plastic forming device particularly useful in elaborate molded passages and holes and filled with ice or another hardened material capable of being melted after the concrete structural member sets, whereupon easy withdrawal is effected.

Structural member combinations that are efficaciously formed by the anchoring systems of the invention include joined columns and joined road barriers. In the case of road barriers intended to be used on a curve, these can be brought end-to-end at less than 180°, so as to follow the curve, and between them, extending into the openings molded therein, a similarly bent anchor member, which may be a length of rebar, extends from within one of the holes in one of barriers to an aligned hole in the adjacent barrier.

The above and further advantages of the invention will be better understood from the following detailed description of a preferred embodiment taken in consideration with the accompanying drawings.

BRIEF DESCRIPTION OF THE DRAWINGS

FIG. 6 is a fragmentary side elevation view partly in section and shows a tapered mold part and the hole formed thereby in a concrete structural member;

FIG. 7 is a side elevation view of an alternative embodiment of a tapered mold part;

FIG. 14 is a fragmentary perspective view of poured concrete columns with holes and passages for the introduction of a liquid securing agent;

FIG. 15 is a fragmentary perspective view of a cast concrete road barrier with holes and passages; and FIG. 16 is a fragmentary top plan view of a pair of barriers like that of FIG. 11 joined angularly by a pre-bent anchor member.

DESCRIPTION OF PREFERRED EMBODIMENT

Figure 1:
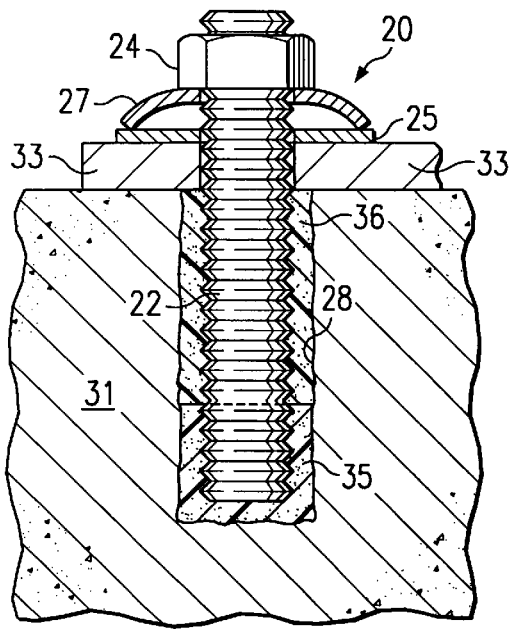
FIG. 1 is a side elevation view partly in section of a grout-in-place anchor system with a deformable load indicating washer.

In FIG. 1 an anchoring system 20 includes a threaded anchor 22 with a retaining nut 24 threaded thereon, a washer 25, and a dished and resiliently deformable washer 27 such as a belleville washer. The anchor 22 which is an elongate threaded member extends into a hole 28 in a structural member 31. The anchor 22 is shown extending through an opening in a plate 33.

Figure 3:
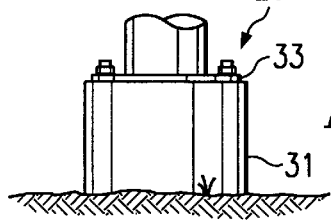
FIG. 3 is a fragmentary side elevation view of a typical installation suitable for use of the anchor system of FIGS. 1 and 2.

In FIG. 3, in a typical use of the anchoring system 20 of FIG. 1, the plate 33 is the mounting flange of a light standard, for example, which is secured to a footing which is the structural member 31. A multitude of other, readily apparent uses of the anchoring system will be recognized.

In the hole 28, the anchor system 20 includes a quantity of a fast-setting polymer resin or other securing agent 35. This fills the bottom of the hole 28 in surrounding relation to the lower end of the anchor 22. Above the quick-setting securing agent 35, a quantity of slower-setting resin or securing agent 36 fills the remainder of the hole 28. A typical fast-setting polymer resin suitable for use as the resin 35 of FIG. 1 is the product sold under the trademark Keligrout by Kelken Construction Systems of Princeton, N.J. The slower-setting resin may be one of the products sold under the trademark Kelipoxy or Keliresin by the same Kelken Construction Systems.

Figure 2:
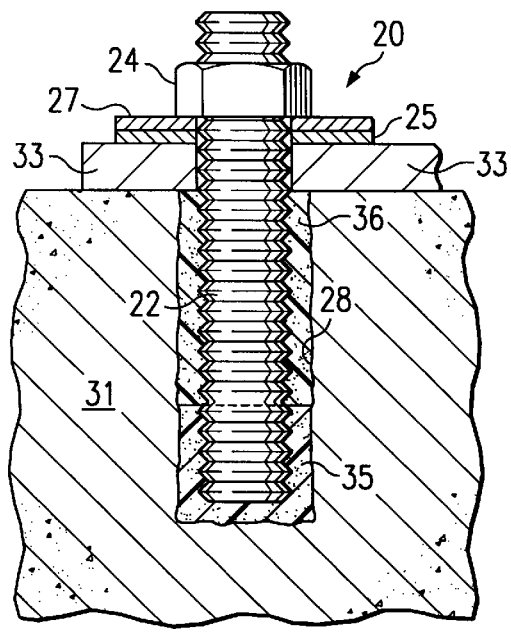
FIG. 2 is a further side elevation view partly in section of the anchor system of FIG. 1 showing its anchor under tension and the washer deformed.

Once the quick-setting resin 35 has set, securing the immersed end of the anchor 22 at the bottom of the hole 28, the retaining nut 24 is tightened down upon the deformable washer 27, flattening the washer and placing the anchor 22 in known and readily discernible tension between the quick-setting resin and the retaining nut 24 as seen in FIG. 2. The dished washer 27 provides a visible indication that the anchoring system 20 has been correctly tightened. The slower-setting resin 36 sets after the anchor has been thus-tensioned. This forms, in effect, a post-tensioned, bonded, pre-loaded system and causes the tension force that elongates the anchor to be stored as reserve energy, compressive forces in the concrete.

Should the anchor system 20 loosen, for example by elongation of the anchor 22 as a result of creep, or by loosening of the nut 24, the deformed washer 27 will return towards its dished condition thanks to its elastic memory and this indicates the loosened condition of the system. The memory urging the dished washer 27 towards its undeformed, dished shape applies tension to the anchor 22 via the nut 24, as well.

Figure 4:
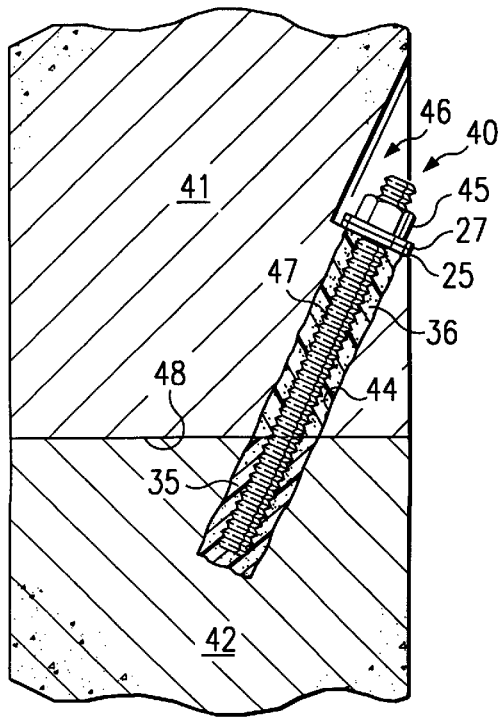
FIG. 4 is a fragmentary, partially sectional view of an anchor system like that of FIG. 1 installed to join columns abutting end-to-end.

In FIG. 4 an anchor system 40, similar to system 20 of FIG. 1, secures together a pair of end-to-end columns 41 and 42. A slanted or diagonal hole 44 opens out of the side of the upper column 41 at an area 46 adapted to receive the washers 25 and 27 and a nut 45. The hole 44 or an aligned hole proceeds diagonally to the interface 48 of the two columns and proceeds into the lower column 42.

The portion of the hole 44 that is in the lower column 42 is filled with the quick-setting resin 35. The portion of the hole 44 extending upward from the interface 48 to exit the side of the upper column 41 is filled with the slower-setting resin 36. Again, the anchor 47, here a length of threaded rebar, is tensioned between the nut 45 and the hardened quick-setting resin 35. This places the columns 41 and 42 in compression at the interface 48.

In similar fashion, other upper members such as road barriers may be secured to such lower members as road surface for an improved system capable of withstanding significant external forces. In such a case, the member 42 would be the surface of the road and the member 41 would be the barrier. The aligned holes in the lower and upper members would be diagonally formed if necessary or simply vertically formed depending on the dimensions and formation of the barrier.

Figure 5:
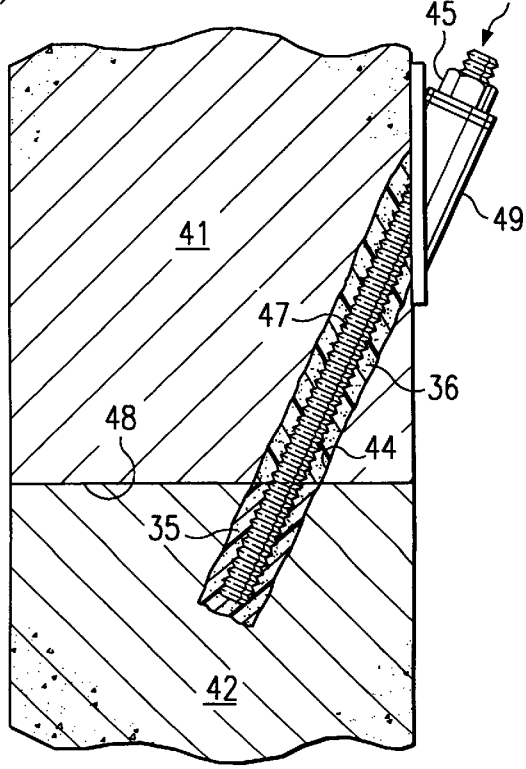
FIG. 5 is a further fragmentary partially sectional view of a further embodiment of the installation of FIG. 4.

In FIG. 5 an alternative column-connecting configuration differs from that of FIG. 4 only in its use of a shoe 49 that provides an engaging surface for the nut 45 at the side of the column 41. By the tensioning of the anchor 47 to tightly compress together the adjoining faces of the columns, the anchoring arrangements of FIGS. 4 and 5 are intended to better withstand the upheaval of an earthquake. These anchoring configurations may be used to retrofit columns previously joined by, for example, passive anchors extending from the lower column, where they might be grouted in place, into the upper column, but without the post-tensioning effect. Failure of structures at such locations has been observed following earthquakes.

In FIG. 6 a mold part 52 has a tapered and threaded exterior surface 54. Below it is shown a corresponding hole 58 formed by the mold part 52 in a poured concrete structural member 59. Threads 61 formed in the hole interior surface facilitate the securing of resin in the hole when used with a system like that of FIG. 1, for example. The mold part 52 is made of high density polyethylene or any high strength material that has good release ability against the just-formed concrete. Alternatively the mold part 52 may be coated with such a plastic. Because it uses no lubricating release agent, no residual release agent remains in the hole 58 to interfere with the molecular bonding of the polymer resin to the interior of the formed hole capable of transferring the elastic load in the anchor to the concrete.

The taper of the mold part 52 also assists in the quick breaking away of that part from the freshly-formed hole. After a few turns, the part may be withdrawn upward as the threads on the external surface of part 52 will have cleared the threads on the internal surface of the hole 58.

In FIG. 7 an alternative mold part is shown in which two generally conical tapered exterior surfaces 63 and 64 are shown joined at a step down in diameter 66. Although the tapered surfaces of both of the mold parts 52 and 62 may be conical, as shown, other tapered shapes will suffice. Both mold parts are provided at their upper ends with a threaded projection 57 and 67, respectively, having an opening through there and providing a means for grasping the part from above.

Figure 8:
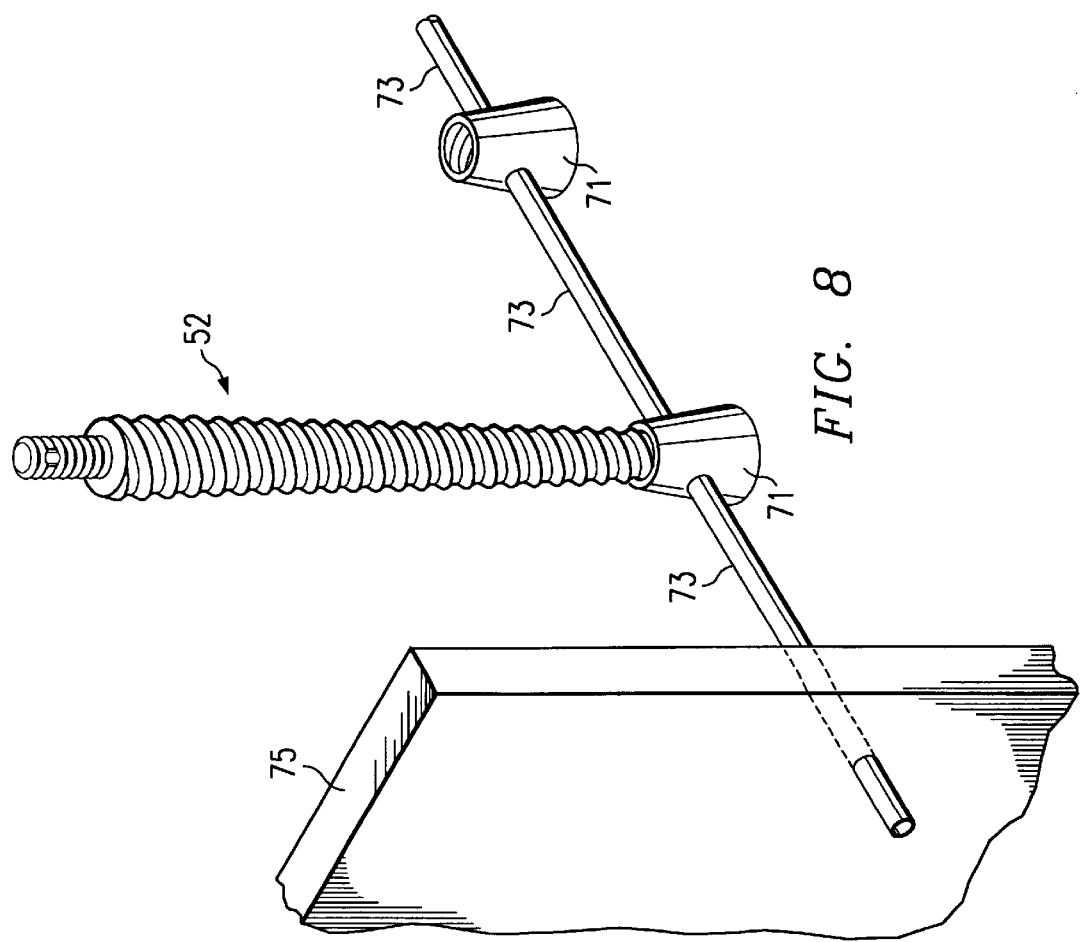
FIG. 8 is a fragmentary perspective view of a system of mold parts to form a tapered hole and connecting passages in a cast concrete structural member.

In FIG. 8 the tapered mold part 52 is shown in a system of mold parts. The system includes a cup-shaped part 71 that receives the tapered end of the mold part 52. Rod-like parts 73 extend to the exterior of a mold, a portion of which is illustrated at 75.

Figure 9:
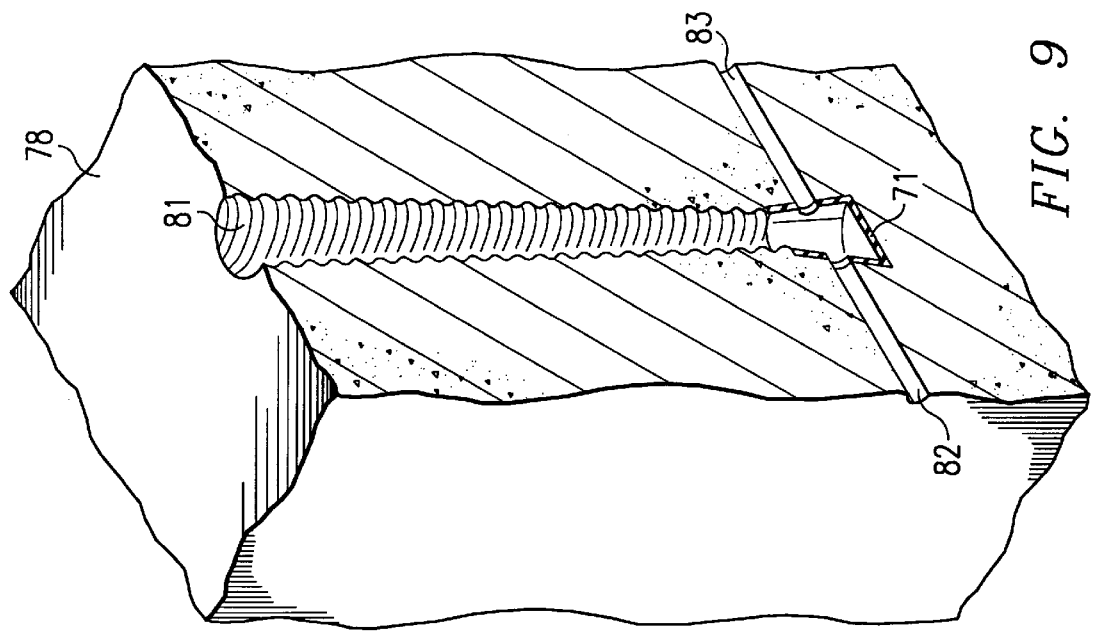
FIG. 9 is a fragmentary sectional view of the cast concrete structural part formed with the mold part assemblage of FIG. 8.

In FIG. 9 a poured concrete structural member 78 has internal openings formed by the system of mold parts of FIG. 8. A tapered hole 81 communicates with passages 82 and 83 through the retained cup-like part 71. The passages 82 and 83 permit the introduction of resin even when the upper end of opening 81 is not accessible. Typically an anchor member will be introduced into the opening 81 and extend into the interior of the cup-like part 71. In an alternative system of mold parts the tapered part 52 may be press fit directly into openings formed at preselected locations in rods or tubes like the parts 73, eliminating the retained cup shaped parts 71.

Additional means for forming holes to accommodate anchors and passages for the introduction of resin are shown in FIGS. 10–13.

Figure 10:
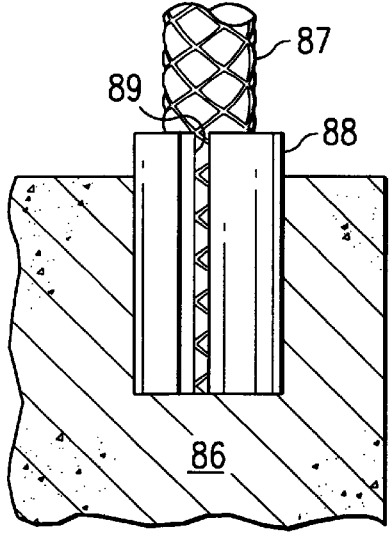
FIGS. 10–13 are fragmentary side elevational views partly in section of further embodiments of mold parts suitable for use in making poured concrete structural members in accordance with the invention.

In FIG. 10, a hole in a structural member 86 is formed by a mold part that includes a core element 87 shown as a length of rebar and a longitudinally slotted sleeve 88. Before the concrete member 86 is poured, the sleeve 88 is resiliently spread to fit over the end of the element 87 and located appropriately with respect to the mold for the structural member 86. After the poured concrete has set, the core element 87 is withdrawn. The sleeve 88 contracts elastically to its original diameter and is readily withdrawn from the newly formed hole. To assure return of the sleeve 88 from its expanded condition, a suitable soft filler may be inserted in the slot 89 to prevent the entrance of the poured concrete, but allowing elastic return of the sleeve 88 to its original, reduced diameter. The FIG. 10 core element and sleeve may be used either to form the hole that is subsequently to receive an anchor, as shown, or in the same manner as the rod-like member 73 of FIG. 8, to form the resin introduction passages 82 and 83 of FIG. 9.

Figure 11:
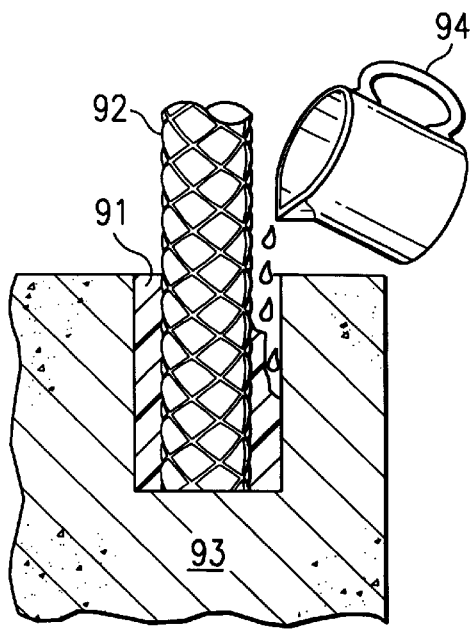

In FIG. 11 a plastic sleeve 91 surrounds a core element 92 to form a molded hole in a structural element 93. The plastic of the sleeve 91 is degradable by use of an appropriate, known solvent, indicated at 94. Preferably the sleeve 91 is destroyed after removal of the core element 92, but alternatively while the element 92 is in place, which element may be the anchor to be retained.

Figure 12:
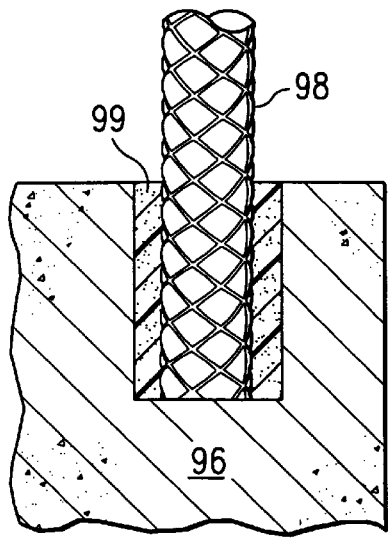

In FIG. 12 a hole in a structural element 96 is molded by a mold part that is a core element 98 and a sleeve 99 that may be polystyrene foam or another material of similar characteristics. The polystyrene foam 99 has sufficient resistance to compression to withstand the inward pressure of the poured concrete of the structural element 96, but upon withdrawal of the core element 98, the polystyrene of the sleeve crumbles. The crumbled sleeve is easily removed to leave a clean, dry hole.

Figure 13:
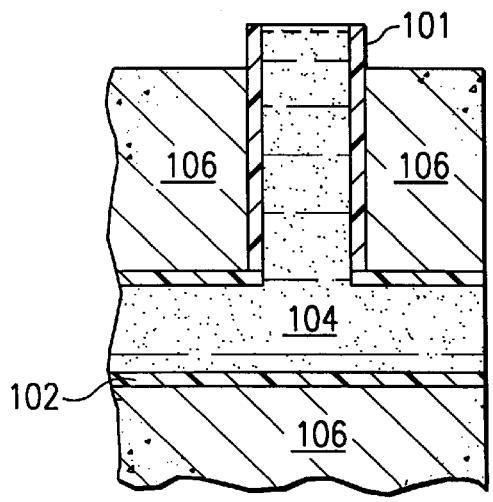

A fourth alternative embodiment, shown in FIG. 13, utilizes thin, hollow plastic members 101 and 102 that are given their sufficient structural integrity by a hardened core material 104 such as ice. Melting of the core material 104 after formation of the structural element 106 enables easy withdrawal of the remaining plastic pieces 101 and 102.

In FIG. 14 a typical installation is illustrated. Here two poured concrete structural members 110 and 111 meet at adjoining faces. Aligned holes 113 in the upper and lower structural members receive anchors extending between them (not shown in FIG. 14). Resin is introduced into the anchor-containing holes through passages 115 and the retained cup-like parts 116.

A further arrangement utilizing molded interior holes and passages is shown in FIG. 15. A cast concrete road barrier 120 has internally threaded conical holes 121 formed therein. The holes 121 communicate with passages 124 through retained cup-like parts 123. Into the holes 121 and the cup-like parts 123 extend anchor members 126 that are, in this case, sections of rebar.

A second barrier, not shown, similarly equipped with holes and passages is brought into alignment with the end of the barrier 120 to receive the free ends of the anchor members 126. Resin introduced through an opening 127 of the passage 124 fills the cup-like mold parts 123 and the threaded holes 121 to secure the anchor members 126 and thus connect the barriers end-to-end.

In a further embodiment of the highway barrier system just described, as shown in FIG. 16, a pair of barriers 131 and 132, are arranged end-to-end. To accommodate a curve in a highway, the barriers are arranged at an angle other than 180°. The anchor member 134 joining together the two barriers 131 and 132 is pre-bent accordingly to permit this relationship. The conical holes 121 allow the pre-bent anchor member to be placed at any attitude so as to accommodate a wide variety of angles between the joined barriers. A butyl rubber seal 135 closes one side of the space between the end faces of the barriers, and a compressed length of suitable compressible plastic or plastic foam 136 is forced into and seals the larger side of the intermediate space. Again the resin is introduced through openings 127 to fill the interior cups 123, the threaded conical holes 121, and the sealed space 139 formed between the ends of the barriers.

Although preferred embodiments of the invention have been described herein it will be recognized that further modifications and alterations may be made by those skilled in the art without departure from the spirit and scope of the invention as defined in the appended claims.

We claim:

1. A system for fastening two members, said system comprising:
    (a) a first aligned hole in one of said two members;
    (b) a second aligned hole in the other of said two members;
    (c) a fast-setting securing agent in said first aligned hole;
    (d) an anchor member having one end secured in said first aligned hole containing said fast-setting securing agent;
    (e) a slower-setting securing agent in said second aligned hole, a portion of said anchor member extending through said second hole and bonded therein by said slower-setting securing agent;
    (f) a retaining member at the end of said second aligned hole, said portion of said anchor member bonded therein by said slower-setting securing agent being in tension, and said two members being placed in compression by forces communicated thereto via said securing agents and said retaining member to define a stored energy system resistive to external forces.

2. The system according to claim 1, wherein at least one of said two members is a concrete member.

3. The system according to claim 1, wherein at least one of said two members is a road surface.

4. The system according to claim 1, wherein said two members are concrete columns set end-to-end at an interface.

5. The system according to claim 1, wherein said anchor member is secured by a tightenable retaining member.

6. The system according to claim 5, wherein said tightenable retaining member is used with a dished washer to indicate the tensioned condition of said anchor member.

7. A method of fastening two members, said method comprising the steps of:
    (a) forming a first aligned hole in one of said two members;
    (b) forming a second aligned hole in the other of said two members;
    (c) introducing a fast-setting securing agent in said first aligned hole;
    (d) setting an anchor member having one end secured in said first aligned hole containing said fast-setting securing agent;
    (e) introducing a slower-setting securing agent in said second aligned hole, a portion of said anchor member extending through said second hole and bonded therein by said slower-setting securing agent;
    (f) providing a retaining member at the end of said second aligned hole, said portion of said anchor member bonded therein by said slower-setting securing agent being in tension, and said two members being placed in compression by forces communicated thereto via said securing agents and said retaining member to define a stored energy system resistive to external forces.

8. The method according to claim 7, wherein said steps of forming said first and second aligned holes comprise forming said first aligned hole or said second aligned hole in a concrete member.

9. The method according to claim 7, wherein said step of forming said first aligned hole comprises forming said first aligned hole in a road surface.

10. The method according to claim 7, wherein said steps of forming said first and second aligned holes comprise forming said first and second aligned holes in concrete columns set end-to-end at an interface.

11. The method according to claim 7, wherein said step of setting said anchor member comprises securing said anchor member with a tightenable retaining member.

12. The method according to claim 11, wherein said step of securing said anchor member comprises using a dished washer to indicate the tensioned condition of said anchor member.

* * * * *